United States Patent [19]
Drohan

[11] Patent Number: 5,103,384
[45] Date of Patent: Apr. 7, 1992

[54] FLASHLIGHT HOLDER

[76] Inventor: William M. Drohan, 9 Myrtle St., Westboro, Mass. 01581

[21] Appl. No.: 598,107

[22] Filed: Oct. 16, 1990

[51] Int. Cl.$^5$ .............................. F21V 21/26
[52] U.S. Cl. ................... 362/191; 362/190; 362/413; 362/418; 362/421
[58] Field of Search .............. 362/190, 191, 413, 418, 362/419, 421, 427, 430, 372, 368, 369

[56] References Cited

U.S. PATENT DOCUMENTS

| | | | |
|---|---|---|---|
| 1,178,594 | 4/1916 | Nixon | 362/427 |
| 1,237,191 | 8/1917 | Friend | |
| 1,651,307 | 11/1927 | Wilkinson | 362/226 |
| 2,524,173 | 10/1950 | Peterson | 248/229 |
| 2,638,297 | 5/1953 | Weinberger | 248/126 |
| 2,778,931 | 1/1957 | Cruz | 240/52.5 |
| 3,393,312 | 7/1968 | Dahl | 362/190 |
| 3,399,856 | 9/1968 | Pecaut | 362/421 |
| 3,418,461 | 12/1968 | Sedlock | 362/191 |
| 3,584,822 | 6/1971 | Oram | 362/421 |
| 4,058,719 | 11/1977 | Chopp | 362/190 |
| 4,238,816 | 12/1980 | Merlo | 362/419 |
| 4,399,498 | 8/1983 | Bacevius | 362/396 |
| 4,417,299 | 11/1983 | Rupp | 362/186 |
| 4,506,317 | 3/1985 | Duddy | 362/426 |
| 4,528,622 | 7/1985 | Bacevius | 362/191 |
| 4,533,982 | 8/1985 | Kozar | 362/183 |
| 4,688,705 | 8/1987 | Miree | 362/72 |
| 4,799,132 | 1/1989 | Perlsweig | 362/191 |
| 4,843,530 | 6/1989 | Mori et al. | 362/413 |
| 4,895,329 | 1/1990 | Sloan | 248/229 |
| 4,897,768 | 1/1990 | Thul | 362/191 |
| 4,907,137 | 3/1990 | Schladitz et al. | 362/421 |
| 4,970,631 | 11/1990 | Marshall | 362/190 |

FOREIGN PATENT DOCUMENTS

| | | | |
|---|---|---|---|
| 140058 | 1/1951 | Australia | 362/427 |
| 459695 | 9/1913 | France | 362/413 |

Primary Examiner—Ira S. Lazarus
Assistant Examiner—Y. My Quach
Attorney, Agent, or Firm—Blodgett & Blodgett

[57] ABSTRACT

Holder for flashlight having an arcuate seat joined to a clamp by a flexible metal cable.

6 Claims, 1 Drawing Sheet

U.S. Patent
Apr. 7, 1992
5,103,384
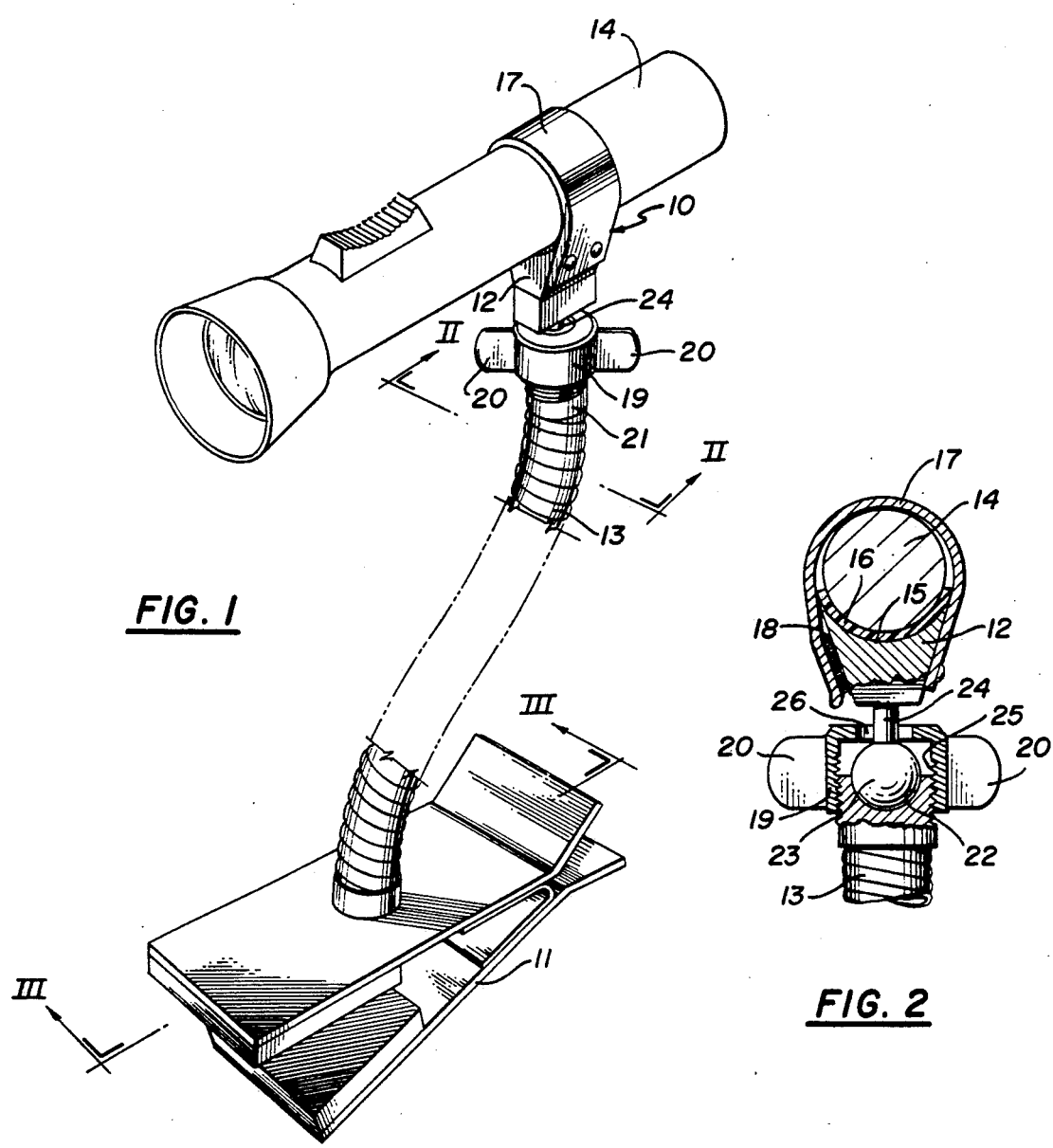
FIG. 1
FIG. 2
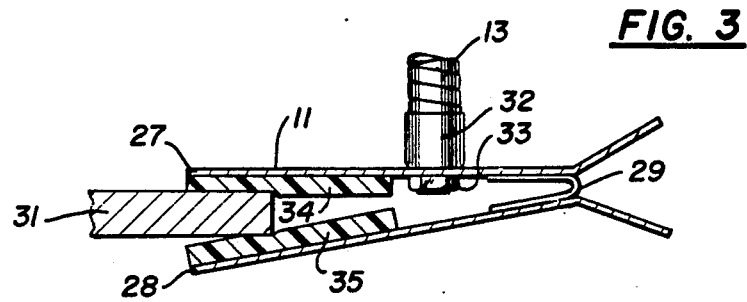
FIG. 3

FLASHLIGHT HOLDER

BACKGROUND OF THE INVENTION

There are many situations in the construction, repair, or manufacturing industries where it is desirable to direct a beam of light to a restricted area. For this purpose, a conventional flashlight provides the needed light beam, but it needs to be supported independently of the user, so that both of his hands are available for the work being done. In the case of the installation of an electrical system, there are many situations where no electrical power is available for use with work lamps and a flashlight can be conveniently used to illuminate a dark recess. In the case of automotive servicing, situations often arise in which a conventional work lamp cannot be adequately positioned to illuminate a work area. Holders for flashlights have been developed over the years, but they have all suffered from a deficiency or another. For instance, they have been difficult to arrange for placing the light beam on an exact spot and maintaining it there. These and other difficulties experienced with the prior art devices have been obviated in a novel manner by the present invention.

It is, therefore, an outstanding object of the invention to provide a flashlight holder in which the direction of the light beam can be easily adjusted.

Another object of this invention is the provision of a holder for a flashlight in which the position of the illumination can be maintained independently of the user, so that both his hands are available.

A further object of the present invention is the provision of a flashlight holder particularly adapted to situations where electrical power is not available for a conventional work lamp.

It is another object of the present invention to provide a flashlight holder which is simple and rugged in construction, which can be inexpensively manufactured from readily-available materials, and which is capable of a long life of useful service with a minimum of maintenance.

A still further object of the invention is the provision of a holder for use in holding a flashlight in which the flashlight is securely held in a desired position, but without the possibility of damage.

With these and other objects in view, as will be apparent to those skilled in the art, the invention resides in the combination of parts set forth in the specification and covered by the claims appended hereto.

SUMMARY OF THE INVENTION

In general, the invention relates to a flashlight holder having a clamp for mounting, having a seat for supporting a flashlight, and having a flexible metal cable joining the clamp to the seat. The flexible metal cable is capable of retaining its shape when bent to direct the flashlight in a desired direction.

More specifically, the seat includes a concave surface of generally semi-cylindrical shape (preferably less than a full semi-cylinder) and the concave surface of the seat is provided with a resilient pad. A flexible strap is fastened at one end to the seat at one side of the concave surface, and the other end of the strap is selectively connected to the opposite side of the seat by hook-and-eye means. One end of the cable is connected to the seat through a ball-and-socket joint.

BRIEF DESCRIPTION OF THE DRAWINGS

The character of the invention, however, may be best understood by reference to one of its structural forms, as illustrated by the accompanying drawings, in which:

FIG. 1 is a perspective view of a flashlight holder incorporating the principles of the present invention, FIG. 2 is a sectional view of the invention taken on the line II—II of FIG. 1, and FIG. 3 is a sectional view of the invention taken on the line III—III of FIG. 1.

DESCRIPTION OF THE PREFERRED EMBODIMENT

Referring first to FIG. 1, which best shows the general features of the invention, the flashlight holder, indicated generally by the reference numeral 10, is shown as provided with a clamp 11 and a seat 12 that are joined by a flexible metal cable 13. The cable is capable of retaining its shape when bent to direct a flashlight 14 in a desired direction.

FIG. 2 shows the details of construction of the upper part of the holder 10. For instance, FIG. 2 illustrates the manner in which the seat 12 is provided with a concave surface 15 which approximates the cylindrical surface of the flashlight 14. In the preferred embodiment shown best in FIG. 2, the surface is somewhat less than a full semi-cylinder. A resilient pad 16 lines the surface 15 and assures that the surface of the flashlight is not scratched, while also providing friction to prevent slippage. A flexible strap 17 is fastened at one end to the seat 12 at one side of the concave surface; the other end of the strap is selectively connected to the opposite side of the seat by velcro patches constituting a hook-and-eye means 18.

The seat 12 is adjustably connected to the upper end of the cable 13 by a ball-and-socket joint 19. More specifically, the upper end of the cable 13 is provided with a threaded plug 21 having a hemi-spherical cavity 22 at its upper end. A ball 23 extends downwardly from the seat 12 and is connected thereto by a short stem 24. An internally-threaded cap 25 having wings 20 is threaded to the plug 21 and has a top closure with an opening 26; this opening is substantially larger than the diameter of the stem 24 and somewhat smaller than the diameter of the ball 23.

FIG. 3 shows the details of the lower part of the holder, including the cable 13 and the clamp 11. The clamp consists of two jaws 27 and 28 that are hinged together and resiliently-biased by a leaf spring 29, so that it can grasp a support element 31 tightly. The lower end of the cable 13 is provided with a threaded plug 32 which extends through the jaw 27 of the clamp and is fixed to it by a nut 33. Rubber pads 34 and 35 are provided for the facing surfaces of the jaws 27 and 28, respectively.

The operation and the advantages of the invention will now be readily understood in the light of the above description. To begin with the clamp 11 is attached to the support element 31, which is selected to be close to the work area that is to be illuminated. The rubber pads 34 and 35 assure that the clamping action does not mar the support element and also provide a friction surface to prevent slippage.

Once the clamp is in place, the flashlight 14 is laid in the concave surface 15 of the seat 12 and the strap 17 is wrapped around it. The velcro patches 18 on the strap 17 and the side of the seat 12 permit (because of the hook-and-eye construction) the strap to be pulled tightly around the flashlight and to be locked in that condition very securely. This is because the longitudinal forces in the strap that would normally pull it away from that side of the seat are countered by the nature of the velcro pads; they allow easy separation by force in the perpendicular direction, but strongly resist parallel forces. The resilient pad 16 not only prevents damage to the flashlight, but also combines (because of its resilience) with the tension in the strap to hold the flashlight securely.

With the flashlight 14 firmly locked in place on the seat 12, it is only necessary to locate the beam on the work area by a gross adjustment accomplished by bending the cable 13 and a final, fine adjustment by means of the ball-and-socket joint 19. The joint is loosened by unscrewing the sleeve 21 by using the thumb wings 20. This lifts the cover of the sleeve away from the ball 23, so that it is free to rotate. When the ball and seat have been rotated sufficiently to line the axis of the flashlight with the work area, the position can be locked by turning the sleeve in the other direction. The ball is, thereby, clamped between the cavity 22 in the plug 21 and the edge of the opening 26 in the cover of the sleeve. The diameter of opening 26 determines the amount of the angular adjustment that can take place between the cable 13 and the seat 12.

It can be seen, then, that the present invention makes is possible to illuminate a limited work area where conventional work lamps are either impossible or difficult to use. Where electrical power is not available, as in the case of the installation of new wiring, it provides for adquate lighting of dark recesses. In the case of fine work, such as soldering and the like, the illumination can be accurately placed for strong illumination in a limited work area. The secure support for the flashlight tends to prevent damage (particularly to the filament in the incandescent bulb) that commonly takes place in a work area due to dropping. By selecting the spring 29 in the clamp with a high spring constant, the clamping action on the support element 31 can be very strong and secure.

Because of its rugged simplicity, the invention can resist considerable abuse due to the activity in work area. It has no sharp protuberances to catch on clothing or to scratch the user. Nevertheless, it is constructed from materials that are easy to obtain, so that its cost should not be excessive. Very little maintenance is necessary to keep it operative and the simple construction should allow it to have a long life of useful service.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Flashlight holder comprising:
   (a) a clamp for mounting, having two jaws which are hinged and resiliently biased together,
   (b) a seat having a concave surface to engage a portion of a flashlight and provided with a resilient pad,
   (c) a cable attached between the clamp and the seat, the cable being flexible but capable of retaining its shape when bent,
   (d) a ball and socket joint connecting the cable to the seat and provided with hand-operable means to adjust the tension, and
   (e) a flexible strap, fastened at one end to the seat at one side of the concave surface, wherein the other end of the strap is selectively connected to the opposite side of the seat by allowing means which allow selective tension on the strap.

2. Flashlight holder as recited in claim 1, wherein said hand-operable means to adjust the ball and socket tension comprise a threaded sleeve and thumb wings.

3. Flashlight holder as recited in claim 1, wherein the seat is provided with a resilient pad to protect said flashlight and increase friction.

4. Flashlight holder as recited in claim 1, wherein said means of selectively connecting the strap to the opposite side of the seat comprise hook and eye means.

5. Flashlight holder as recited in claim 1, wherein said clamp is adapted for one-handed operation.

6. Flashlight holder as recited in claim 1, wherein said concave surface is generally semi-cylindrical but less than a full semi-cylinder.

* * * * *